(No Model.)
L. E. GIESCHEN.
FISHING BASKET OR CREEL.
No. 566,903.                    Patented Sept. 1, 1896.
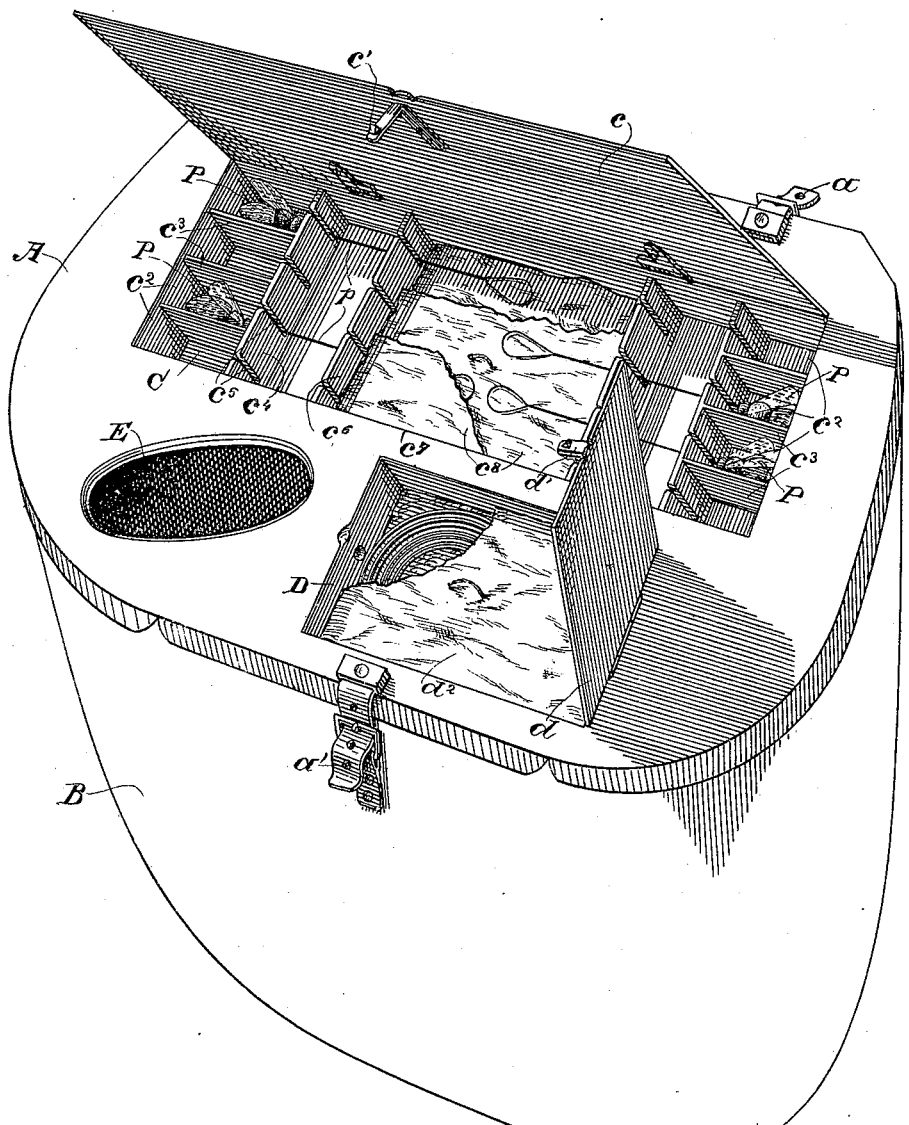
Witnesses,
J. H. Rouse
H. F. Ascheck
Inventor,
Louis E. Gieschen
By Dewey & Co.
Attys

UNITED STATES PATENT OFFICE.

LOUIS EDGAR GIESCHEN, OF OAKLAND, CALIFORNIA.

FISHING BASKET OR CREEL.

SPECIFICATION forming part of Letters Patent No. 566,903, dated September 1, 1896.

Application filed December 17, 1895. Serial No. 572,400. (No model.)

*To all whom it may concern:*

Be it known that I, LOUIS EDGAR GIESCHEN, a citizen of the United States, residing at Oakland, county of Alameda, State of California, have invented an Improvement in Fishing Baskets or Creels; and I hereby declare the following to be a full, clear, and exact description of the same.

My invention relates to the general class of fishing apparatus; and it consists of the improved fishing basket or creel hereinafter described and claimed.

The object of my invention is to provide a simple, serviceable, and convenient device which, while serving all the purposes of a basket, will serve the additional ones of a fly-book and leader-box.

Referring to the accompanying drawing, the figure is a perspective view of my device.

A represents a plate which may consist of any suitable material, wood or metal, as may be desired, said plate being shaped and adapted to serve as the cover of the fishing-basket B, to which it may be secured in any suitable manner, as, for example, by means of the two straps $a$ at the back, which serve as hinges, and the single strap $a'$ in the front serving as a lock. In this plate is formed a receptacle C for containing the flies, another receptacle D for containing the leaders, and an aperture E, in convenient position and of approved shape, through which to insert the fish.

By having the fly-book and leader-box combined with the cover or lid of the fishing-basket great convenience is obtained, because the flies may be reached without the trouble and annoyance of taking a book out of the pocket and of opening it, and the leaders may be reached without the trouble of opening a separate box. The separate book and box are thus dispensed with, and the constant liability and danger of loss of either or both are avoided, nor can the flies and leaders be forgotten unless the entire fishing-basket is forgotten, which is not likely. The receptacle C, which forms the fly-book, though it be made in any suitable manner adapted to contain the flies, is best made as I shall now describe. It has a hinged lid $c$, provided with a suitable catch $c'$, by which it will remain closed, and yet may be opened by intention. The interior of the receptacle at each end is divided into a number of separate compartments $c^2$ by vertical partitions $c^3$, and in these compartments the various flies P may be laid loosely and separately. The inner end wall $c^4$ of these compartments is provided with vertical slots $c^5$, through which the snells $p$ of the flies pass and are separately guided. A second slotted wall $c^6$ may be placed near the wall $c^4$, and the snells will pass through this also, which will afford ease in the space between the walls to pick up the snell of any fly wanted. In the middle of receptacle C is the main compartment $c^7$, in which are moisture-laden pads $c^8$. The snells of the flies extend across into the pad-compartment, where their loops lie between the moisture-laden pads, and said loops are thus always kept wet, which is a great desideratum in avoiding the danger of breaking, due to their brittleness when dry. Thus in this book the flies may be laid loosely and their snells kept properly moist, and each fly will be in plain sight when the lid is opened, and a selection may be quickly and accurately made. The leader-box D may likewise be of any suitable construction, provided with a swinging top $d$, with a suitable catch $d'$, and furnished on its interior with moisture-laden pads $d^2$, whereby the leaders may be always kept in a moist condition.

Having thus described my invention, what I claim as new, and desire to secure by Letters Patent, is—

1. A fishing basket or creel having a hinged cover provided with an aperture through which the fish are inserted, said cover having, also, a permanent receptacle for the leaders.

2. A fishing basket or creel having a cover with an aperture through which the fish are inserted, said cover having a permanent receptacle comprising parallel vertically-disposed slotted partitions through which the snells are passed, and separate compartments at the ends of the main receptacle, for the flies.

3. A fishing basket or creel having an aperture through which the fish are inserted, said cover having a permanent receptacle consisting of spaced partitions at opposite ends, forming independent receptacles for the flies, transverse slotted partitions through which the snells are passed and moisture-laden pads in the central compartment between adjacent partitions, between which the loops lie.

In witness whereof I have hereunto set my hand.

LOUIS EDGAR GIESCHEN.

Witnesses:
GEORGE ADAMS,
R. S. LECKIE.